United States Patent [19]

Sakai et al.

[11] Patent Number: 5,014,136
[45] Date of Patent: May 7, 1991

[54] ELECTRONIC STILL CAMERA DEVICE

[75] Inventors: Nobuya Sakai, Kawagoe; Harumi Aoki, Iruma, both of Japan

[73] Assignee: Asahi Kogaku Kogyo Kabushiki Kaisha, Tokyo, Japan

[21] Appl. No.: 262,834

[22] Filed: Oct. 26, 1988

[30] Foreign Application Priority Data

Oct. 29, 1987 [JP] Japan ............................. 62-166088[U]
Oct. 29, 1987 [JP] Japan ................................ 62-274385
Oct. 30, 1987 [JP] Japan ................................ 62-274824

[51] Int. Cl.$^5$ .............................................. H04N 5/76
[52] U.S. Cl. ..................................... 358/341; 358/906
[58] Field of Search .................... 360/33.1, 35.1, 19.1; 358/335, 906, 341, 343, 909

[56] References Cited

U.S. PATENT DOCUMENTS

| | | | |
|---|---|---|---|
| 4,507,686 | 3/1985 | Kimura | 358/906 |
| 4,531,161 | 7/1985 | Murakoshi | 358/906 |
| 4,602,296 | 7/1986 | Murakoshi | 360/35.1 |
| 4,695,905 | 9/1987 | Utsugi | 358/906 |
| 4,725,897 | 2/1988 | Konishi | 358/906 |
| 4,746,993 | 5/1988 | Tada | 358/335 |
| 4,777,537 | 10/1988 | Ueno et al. | 358/341 |
| 4,792,866 | 12/1988 | Hirobe et al. | 358/342 |
| 4,819,101 | 4/1989 | Lemelson | 360/35.1 |
| 4,841,382 | 6/1989 | Sasaki et al. | 360/32 |
| 4,858,031 | 8/1989 | Fukuta | 358/906 |

Primary Examiner—Donald McElheny, Jr.

Attorney, Agent, or Firm—Sandler, Greenblum & Bernstein

[57] ABSTRACT

An electronic still camera device has a camera unit capable of recording and reproducing video and audio signals, and an audio adapter detachably attached to the camera unit and which has operation switches, a microphone, a collected sound amount indicator and a circuit capable of compressing and expanding audio signals. To reduce the number of signal lines between the camera unit and the audio adapter, the audio adapter is automatically set in the audio playback mode when the audio adapter has detected that compressed audio signals are being delivered from the camera unit to the audio adapter. The camera unit has a power supply arranged to superpose a D.C. voltage of a high level or a low level to the compressed audio signal. A power supply switch provided in the audio adapter is capable of selectively supplying the source power from the camera unit to the audio adapter in accordance with the level of the D.C. voltage. In order to enable the user to conduct sound collection, sound cancelling and sound recording at any desired timing, the audio adapter has switches capable of generating a sound collection starting instruction, a sound collection stopping instruction and a sound cancelling instruction, and operation is executed in accordance with these instructions. A collected sound amount indicator is provided for indicating the amount of collected sound in terms of the sound collection time.

25 Claims, 8 Drawing Sheets

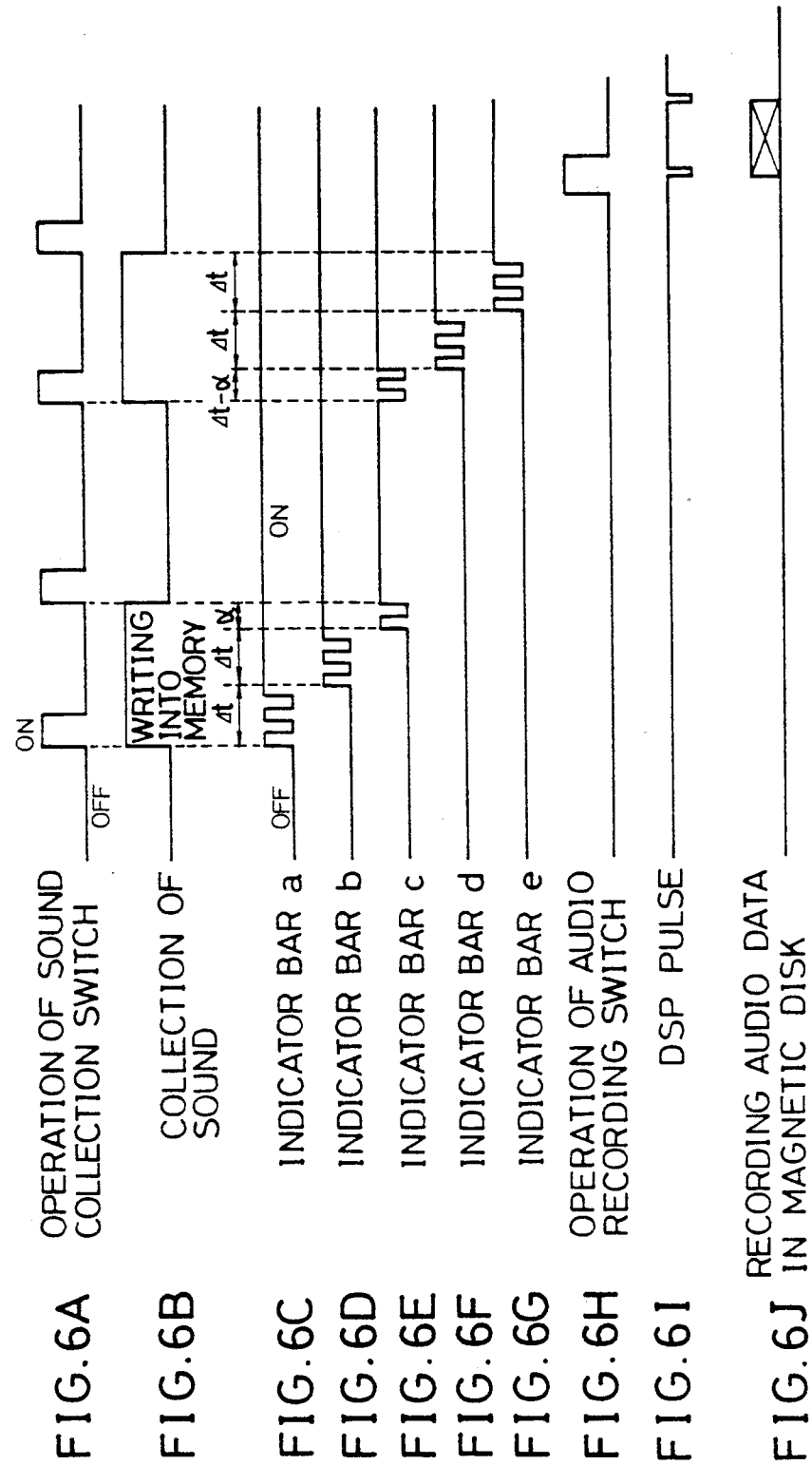

ELECTRONIC STILL CAMERA DEVICE

BACKGROUND OF THE INVENTION

1. Field of the Invention

The present invention relates to an electronic still camera device that is capable of recording and reproducing image and sound signals.

2. Description of the Prior Art

Electronic still camera devices are generally large in size due the to incorporation of magnetic disk devices, and there is an increasing demand for a reduction in the size of this type of camera.

There also is a demand for electronic still camera devices that are capable of recording not only images, but also sounds.

In known electronic still camera devices of this type, sound signals are recorded on a magnetic disk in a time-base-compressed manner. During play back, the read sound signals are time-base-expanded to reproduce the original sound. Thus, the electronic still camera device of this type essentially has many devices and elements which are used specifically for recording and reproducing sounds, including a large capacity memory, an A/D converter, a D/A converter, a CPU, a timing control circuit, a sound collecting operation switch, a sound recording operation switch, a sound level indicator, and so forth.

In consequence, the size of electronic still camera devices having a sound recording/reproducing function is inevitably large, failing to meet the demand for reduction in the camera device size.

In some cases, the user may wish to record only images while omitting sounds. It is also conceivable that the user wishes to first an image and then record sounds. In addition, the supplier of camera devices of this kind have to produce different types of camera devices, i.e., camera devices with and without the sound recording functions because the sound recording/playback function is not necessary for some users, so that the cost of production of the electronic still camera device is undesirably raised.

Known electronic still camera devices are generally designed such that the recording of sounds is possible only for a predetermined period after the pressing of an exposure release button. Thus, recording of sounds is often hindered due to the presence of undesirable noise sounds at the time of exposure. Even if the sound recording itself is not impossible, the quality of the recording is seriously impaired due to the noise sounds. The noise sound may occur suddenly. The recorded sound, therefore, may include undesirable noises which has started after the commencement of the audio recording.

SUMMARY OF THE INVENTION

Accordingly, a first object of the present invention is to provide an electronic still camera device which meets the demand for reduction in size and which has a function for enabling the user to record sound whenever necessary, the camera device also being standardized in construction to reduce production costs.

A second object of the present invention is to provide a compression-type sound recording device which is capable of enabling the user to always record sounds under good conditions.

Other objects of the invention will become clear from the following description.

In order to achieve the first object, the present invention provides an electronic still camera device having an electronic still camera unit and an audio adapter that is capable of being detachably mounted on the electronic still camera unit, wherein the electronic still camera unit comprises: an audio signal input terminal through which audio signals are supplied from the audio adapter to the electronic still camera unit; an audio signal output terminal through which audio signals are supplied from the electronic still camera unit to the audio adapter; signal writing means for writing the audio signals supplied through the audio input terminal into a recording medium; and signal reading means for reading the audio signals from the recording medium and delivering the read audio signals through the audio output terminal; wherein the audio adapter comprises: a microphone; first audio signal processing means for processing audio signals from the microphone; an audio signal output terminal through which the audio signals processed by the first audio signal processing means are supplied to the electronic still camera unit; an audio signal input terminal through which audio signals are supplied from the electronic still camera unit to the audio adapter; and second signal processing means for processing audio signals supplied through the audio input terminal.

According to another aspect of the invention, there is provided an electronic still camera device comprising: a camera unit having an imaging device that is capable of imaging an object, a first external input terminal through which compressed audio signals are inputted to the camera unit, a recording medium that is capable of recording image signals from the imaging device and the compressed audio signals from the first external input terminal, and a first output terminal through which the image signals and the compressed audio signals reproduced from the recording medium are externally delivered; and an audio adapter that is capable of being selectively attached to the camera unit and operable both in an audio recording mode and an audio play back mode, the audio adapter including a microphone capable of collecting sounds in the audio recording mode, an A/D converter for converting the output from the microphone into digital audio signals, temporary audio storage means for temporarily storing the digital audio signals, reading means capable of reading the audio data from the temporary audio storage means in a time-base-compressed manner, a second external output to be connected to the first external input terminal of the camera unit so as to deliver the time-base-compressed audio signals to the camera unit, a second external input terminal to be connected to the first external output terminal of the camera unit so as to receive time-base-compressed audio signals from the camera unit, and means for effecting time-base-expansion of the received time-base-compressed audio signals.

This arrangement enables the user to record sounds simply by attaching the audio adapter to the camera unit whenever sound recording is necessary. Conversely, if the user wishes to record only images or to record images first, followed by a sound recording, the user operates only the camera unit without the audio adapter. Thus, the electronic still camera device can meet both the demand for reduced size and the demand for optional audio recording function.

In addition, manufacturers are required only to produce and sell the camera unit which does not have a sound recording function, because purchasers who wish to enjoy sound recording functions can purchase the audio adapter separately.

The standardized camera unit can easily be mass-produced so that the production cost of the electronic still camera devices is reduced advantageously.

This electronic still camera device, however, encounters a problem in that many signal lines are required to enable a signal exchange between the camera unit and the audio adapter which are constructed as separate units.

Accordingly, a third object of the present invention is to provide an electronic still camera device which is improved in such a way as to reduce the number of signal lines which are to be used for the signal exchange between the camera unit and the audio adapter.

To this end, according to the present invention, the audio adapter may further include: judging means that is capable of judging the presence or absence of the time-base-compressed audio signal from the second external input terminal; and mode control means capable of setting the audio adapter in the audio playback mode when the judging means has judged that the time-base-compressed audio signal exists, and in the audio recording mode when the judging means has judged that the time-base-compressed audio signal does not exist.

This audio adapter eliminates the necessity for a signal line which is specifically intended for transmitting, from the camera unit to the audio adapter, a signal indicative of the operation mode of the audio adapter: namely, whether the adapter is to operate in the sound recording mode or in the sound reproducing mode.

The electronic still camera device of this type may be arranged such that the camera unit further includes a power supply having an output terminal that is connected to an external power supply terminal and which is capable of supplying a source voltage to the camera unit, and D.C. voltage superposing means connected to the first external output terminal and which is capable of superposing a D.C. voltage of a high level or a D.C. voltage of a low level depending on whether either one of the audio recording mode or the audio playback mode has been selected, while the audio adapter further includes a power supply switch having one end connected to a third input terminal connected to the external power supply terminal and the other end connected to the power line of the audio adapter, and power supply switch control means capable of turning the power supply switch ON and OFF in accordance with the level of the D.C. voltage received at the second external input terminal.

In such an arrangement, the signal line which is used exclusively for the transmission of a power control signal from the camera unit to the audio adapter can be dispensed with. In addition, the audio adapter is only supplied with electric power when it is required to operate, whereby wasteful use of electrical power is prevented.

The third object of the present invention mentioned before can also be achieved by an electronic still camera device having a compression audio recording device in which sound collected through a microphone is written to a temporary audio storage means through an A/D converter and the written audio data is read in a time-base-compressed manner and written to a recording medium through a D/A converter, the electronic still camera device comprising: sound collection starting switch means capable of producing a sound collection starting instruction; sound collection stopping switch means capable of producing a sound collection stopping instruction; cancel switch means capable of producing a cancelling instruction; audio recording switch means capable of producing an audio recording instruction; address memory means capable of storing address of audio data stored in the temporary audio storage means; writing control means operative in response to the sound collection starting instruction so as to enable the audio data in the temporary audio storage means at the address through the A/D converter while updating the content of the address memory means; writing stop control means for stopping the writing in response to the sound collection stopping instruction; cancel control means operative in response to the cancelling instruction so as to erase the audio data stored in the temporary audio storage means while initializing the content of the address memory means; and audio recording control means operative in response to the audio recording instruction so as to read the audio data stored in the temporary audio storage means in a time-base-compressed manner and writing the read data to the recording medium.

With this camera device, the user can commence audio recording whenever he wishes to record sounds. In addition, the sound recording can be stopped and restarted as required during the sound recording operation, which enables the user to record sounds under optimum conditions.

In the event that the sound recording has been done under a bad condition, the user can erase the content of the memory by operating a cancel switch before the content is time-base-compressed and transferred to the recording medium.

It is therefore possible to prevent the recording of undesirable sound data in the memory medium.

This electronic still camera device also can have a collected sound amount indicator means capable of indicating the amount of sound collected; and indicator control means capable of controlling the collected sound amount indicator means in such a manner that the collected sound amount indicator means indicates the amount of collected sound corresponding to the content of the address memory means.

With this arrangement, the amount of sounds can always be confirmed regardless of repeated start and stop of the sound recording operation, whereby the sounds can be recorded in an optimum form.

BRIEF DESCRIPTION OF THE DRAWINGS

FIGS. 6A to 6J are timing charts which show, in combination with the flow charts of FIGS. 5A and 5B, the operation of the system controller.

DESCRIPTION OF THE PREFERRED EMBODIMENTS

A preferred embodiment of the present invention will be described with reference to the accompanying drawings.

Figure 1:
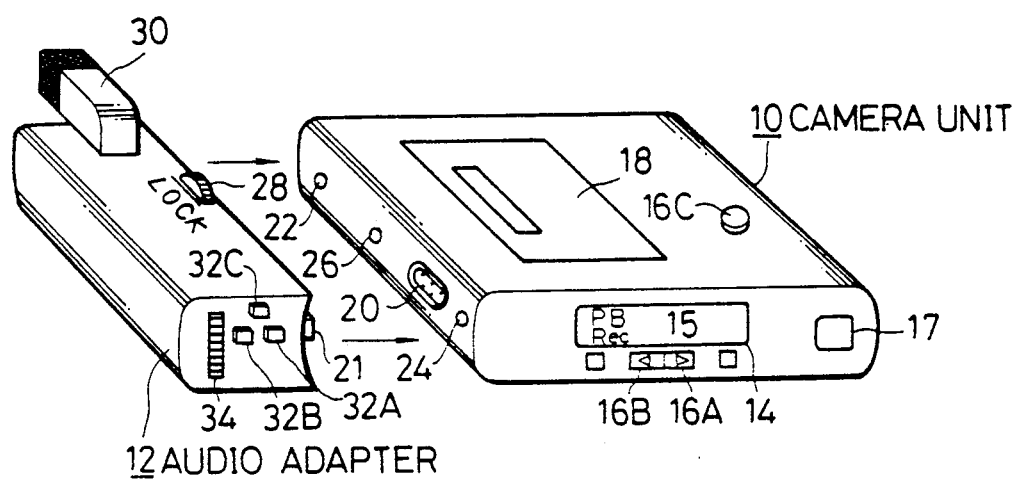
FIG. 1 is a perspective view of a first embodiment of the electronic still camera device in accordance with the present invention.

Referring to FIG. 1, which is a perspective view of an electronic still camera device in accordance with the present invention, the camera device includes a camera unit 10 and a sound adapter 12 which is adapted to be selectively attached to the camera unit 10.

Ordinary photographing operation, i.e., image recording operation, can be done with the camera unit 10 alone. The user can also record sounds together with an image, if necesary, by means of the audio adapter 12 which can optionally be attached to the camera unit 10.

The camera unit 10 has an indicator 14 which indicates the operation mode of the camera, such as recording, playback and so forth, as well as other data useful for the user.

The camera unit 10 also has an increment switch 16A which is capable of giving instruction for moving a magnetic head in the camera unit 10 radially outwardly by an amount which corresponds to one pitch of the tracks on a recording medium, which is in this case a magnetic disk, and a decrement switch 16B which is capable of giving instructions for moving the magnetic head in the camera unit 10 radially inwardly by an amount which corresponds to one pitch of the tracks on the recording medium. Numeral 16C denotes a release switch, while 17 designates a viewfinder. A cover 18 provided on the camera unit 10 is swingable between an open position and a closed position so as to selectively provide an opening through which the magnetic disk is put into and out of the camera unit 10.

The camera unit 10 also has a female connector 20 which is adapted to mate with a male connector 21 on the sound adapter 12, so as to enable various signals to be exchanged between the camera unit 10 and the audio adapter 12, while transmitting electrical power from a power supply in the camera unit 10 into the audio adapter 12.

Numerals 22 and 24 denote holes which enable the audio adapter to be correctly located and be fixed against rotation, upon receiving pins (not shown) provided on the sound adapter 12 when the audio adapter 12 is mounted on the camera unit 10.

A reference numeral 26 denotes a mounting threaded hole. The arrangement is such that a screw (not shown) projected from the audio adapter 12 is screwed into the threaded hole 26 as a lock operation knob 28 on the audio adapter 12 is manually moved slidingly, whereby the adapter 12 is mounted on the camera unit 10.

Referring now to the audio adapter 12, a microphone 30 provided in the audio adapter 12 is capable of collecting sound to be recorded. A sound collection switch 32A is manually operable to alternately produce a sound collection starting instruction and a sound collection stopping instruction, while a sound recording switch 32B, which also is manually operable is capable of producing an instruction which causes the sound data written in an audio memory (i.e., RAM) of the audio adapter 12 to be time-base-compressed and recorded on the magnetic disk mounted in the camera unit 10, as will be explained later in connection with FIGS. 6H and 6J.

A cancel switch 32 is provided for giving an instruction for clearing the content of the audio memory of the RAM, i.e., to erase the sound data before the transmission of such data to the magnetic disk. A sound collection amount indicator 34 has a plurality of indicator bars (LEDs or LCDs) which are arranged in a side-by-side fashion. The amount of the sound data which has already been collected and written to the RAM of the audio adapter 12 is indicated by the number of the indicator bars which are lit. The sound collection amount indicator 34, may also comprise other types of devices, e.g., such as a two-dimensional LCD plate which is capable of showing the amount of data collected and stored in terms of luminance area.

Figure 2A:
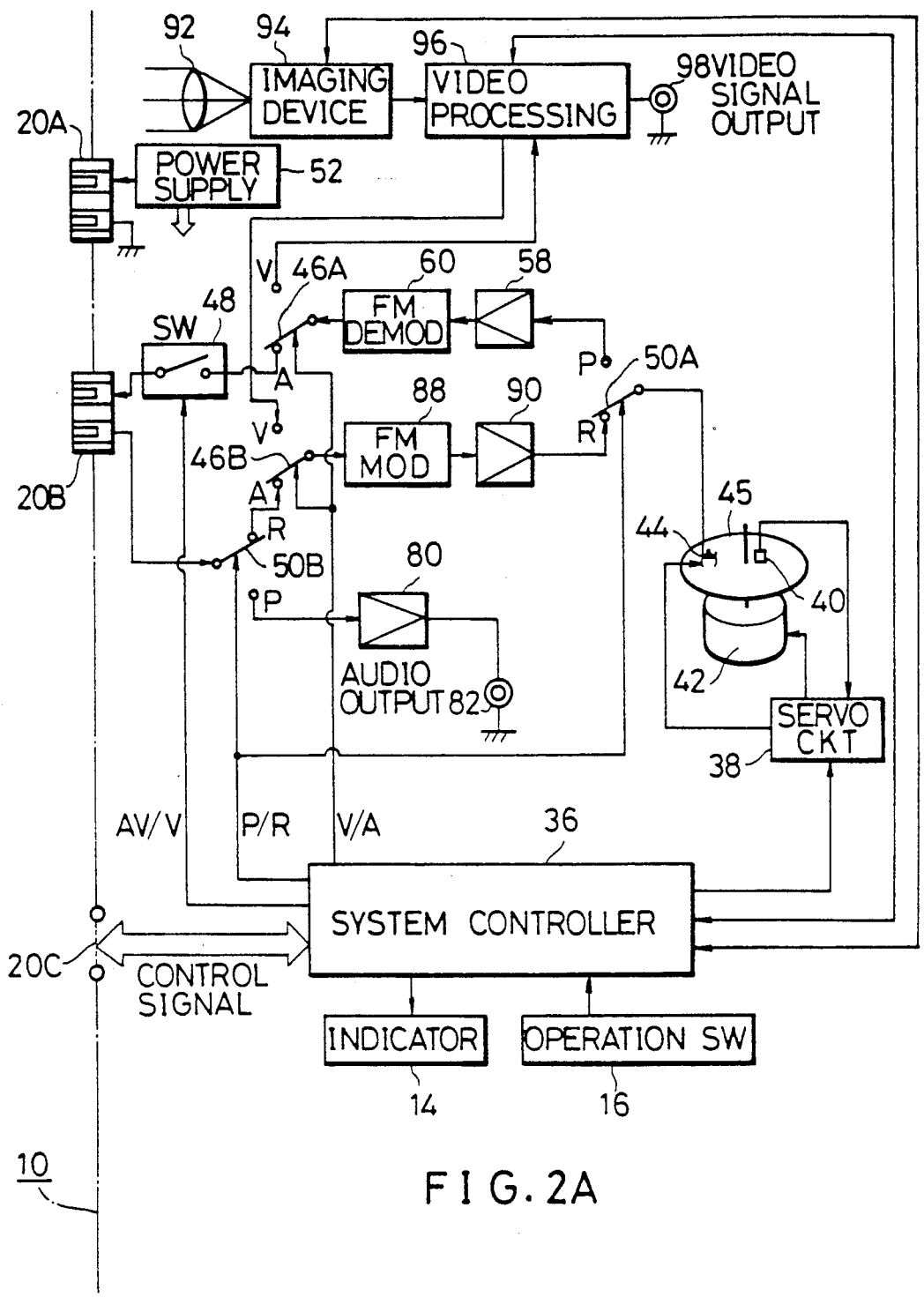
FIG. 2A is a block diagram showing the construction of a camera unit of the electronic still camera device shown in FIG. 1.
Figure 2B:
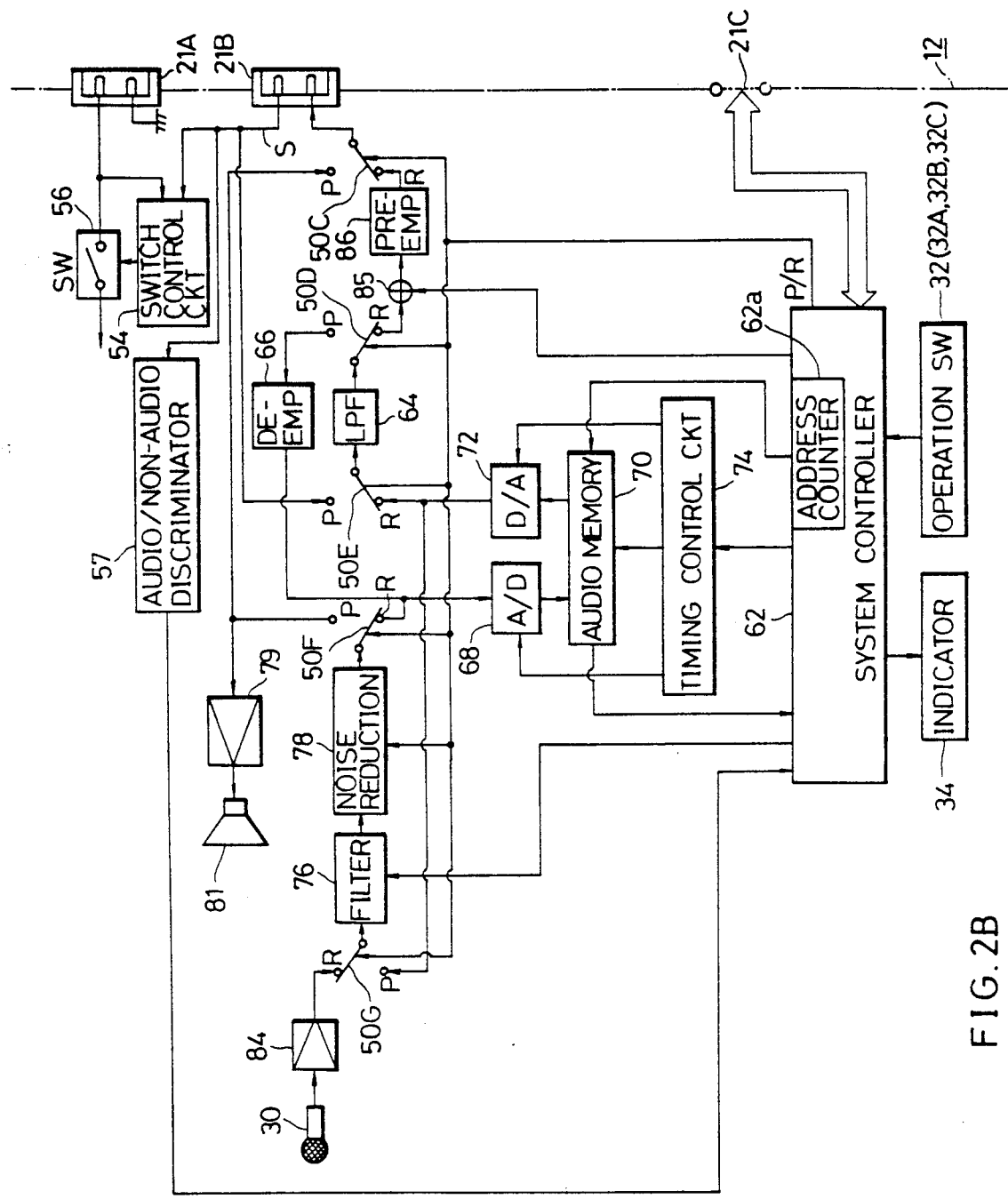
FIG. 2B is a block diagram showing the construction of an audio adapter which can optionally be attached to the camera unit.

The camera unit 10 and the audio adapter 12 will be described in more detail with reference to FIGS. 2A and 2B, respectively.

The female connector 20 explained before in connection with FIG. 1 has female connector pins 20A, 20B and 20C, while the male connector 21 which also was mentioned before has male connector pins 21A, 21B and 21C. The female connector pins 20A, 20B and 20C are adapted to be connected to the male connector pins 21A, 21B and 21C, respectively.

The camera unit 10 incorporates a system controller 36 which is capable of performing various types of control in accordance with instructions which are given through, for example, the aforementioned switches 16A, 16B and 16C (also referred to as an operation switch 16, collectively), while enabling the indicator 14 to indicate various data, such as the number of the track which is being used and the mode in which the device is operating. The camera unit 10 also incorporates a servo circuit 38 which conducts the control of operation of the spindle motor 42 in accordance with the pulses from a PG coil 40. These pulses are shown as DSP pulses in FIG. 6I. The servo circuit 38 also conducts tracking control for enabling the magnetic head 44 to select and follow tracks in the magnetic disk.

The magnetic disk, which is denoted by 45, is driven by the spindle motor 42 and is selectively accessed by a magnetic head 44 so that a video signal and a compressed audio signal are recorded on and reproduced from the magnetic disk 45 by means of the magnetic head 44.

Numerals 46A, 46B denote video/audio change-over switches. These switches have V (video) terminals and A (audio) terminals. When the camera device is to be used for recording or reproducing an image, the switches 46A and 46B are turned to select V terminals, whereas, when recording or reproducing audio signals, these switches are turned to select A terminals.

An AV/V switch 48 is turned ON when both video and audio data are to be recorded or reproduced and turned OFF when only video recording or playback is to be conducted.

Recording/playback change-over switches 50A and 50B are adapted to be turned to select R terminals for video or audio recording and to select P terminals for video or audio playback, i.e., for reproducing the recorded image or sound.

The video/audio change-over switches 46A, 46B, AV/V switch 48 and the recording/playback change-over switches 50A, 50B are controlled by the system controller 36 mentioned before.

Various elements and circuits in the camera unit 10 and the audio adapter 12 operate with electrical power which is supplied from a system power supply incorporated in the camera unit 10.

The supply of the electrical power to the audio adapter 12 is necessary only when the recording or reproduction of sounds is necessary. In the camera device of this embodiment, therefore, the supply of electrical power to the audio adapter 12 is controlled by means of the AV/V switch 56, which is provided in the power supply line of the audio adapter 12. Thus, power is not supplied to the audio adapter 12 whenever the AV/V switch has been turned OFF, even though the audio adapter 12 is mounted on the camera unit 10. The system controller 36 controls the AV/V switch 48 when the operation switch 16 is operated during audio recording or upon detection that the magnetic disk under reproduction carries not only video signals but also audio signals. The system controller 36 also controls the AV/V switch 56 upon detection of turning ON of the AV/V switch 48, so that electrical power is supplied from the power supply 52 to the audio adapter 12. In consequence, the source voltage is supplied to the audio adapter only when the operation of the audio adapter is necessary, whereby wasteful consumption of electrical power is avoided.

In addition, the switch control circuit 54 detects the level of voltage on the signal line S which transmits the compressed reproduced audio signal superposed on a D.C. voltage, thus determining whether the AV mode has been selected. It is, therefore, not necessary to employ a specific signal line for the purpose of informing the audio adapter 12 that the AV mode has been selected, whereby the number of signal lines which are to be connected between the camera unit 10 and the audio adapter 12 is reduced, thus contributing to simplification of the construction.

Recording/playback change-over switches 50C, 50D, 50E, 50F and 50G, collectively referred to as recording/playback change-over switch 50, are turned to select R terminals and P terminals, respectively, when audio recording and audio playback are to be conducted.

In order that the recording/playback change-over switches 50C to 50G are operated in response to the operation of the recording/playback change-over switches 50A, 50B on the camera unit 10, it is necessary that a control signal line is provided between the camera unit 10 and the audio adapter 12, for the purpose of transmitting a switch operation signal from the system controller 36 in the camera unit 10 to the audio adapter 12. Provision of such a control signal line, however, does not meet the demand for reduction in the number of signal lines, i.e., simplification of the electronic camera device as a system. The illustrated embodiment, therefore, employs the following circuit arrangement.

In the illustrated embodiment, the system controller 36 of the camera unit 10 controls the recording/playback change-over switches 50A, 50B to select P terminals when the device is set for operation in the playback mode by the operation of the operation switch 16. In consequence, the compressed audio signals read by the magnetic head 44 are delivered to an audio/non-audio discriminator 57 through a playback amplifier 58, an FM demodulation circuit 60, a video/audio change-over switch 46 and an AV/V switch 48. The audio/non-audio discriminator 57, upon detecting that the signal input thereto contains audio signals, delivers a playback mode selecting instruction to the system controller 62 in the audio adapter 12. The system controller 62 turns the recording/playback change-over switches 50C to 50G to select P terminals, in response to the playback mode selecting instruction.

It is therefore not necessary to provide a control signal line between the camera unit 10 and the audio adapter 12 for the purpose of transmitting the recording/playback mode selection instruction, whereby the number of signal lines between the camera unit 10 and the acoustic adapter 12 is reduced. The compressed audio signal transmitted from the camera unit 10 to the audio adapter 12 is transmitted not only to the switch control circuit 54 and the audio/non-audio discriminator 57, but also to a low-pass filter 64 through the recording/playback change-over switch 50E. The compressed audio signal is further transmitted to the de-emphasis circuit 66 and an A/D converter 68 so as to be converted into digital signals which are then stored in an audio memory 70 as compressed audio data. The compressed audio data stored in the audio memory 70 is read in a time-base-expanded manner and changed to analog signals through a D/A converter 72. The timing of the operation of the A/D converter 68, audio memory 70 and the D/A converter 72 is controlled by a timing control circuit 74, which operates in response to control instruction given by the system controller 62. The storage address of data in the audio memory 70 is appointed in accordance with the content of the address counter 62a, which is one of the elements of the system controller 62. The content of the address counter 62a is incremented each time a word of audio data is written in the audio memory 70, so that the content always indicates the address of reading or writing of the next acoustic data. The analog signal from the D/A converter 72 is transmitted and processed through the recording/playback change-over switch 50G, a filter 76, a noise reduction circuit 78, the recording/playback change-over switches 50F, 50C, 50B and a playback amplifier 80, whereby audio signals are obtained through an audio output terminal 82.

The signal passing switch 50F is also supplied also to speaker 81 through a playback amplifier 79 so that the sound is reproduced.

When the device is used for audio recording purpose, the recording/playback change-over switches 50A and 50B are turned to select R terminals so that the audio/non-audio discriminator 57 detects that no compressed audio signal exists. The system controller, therefore, recognizes that the recording mode has been selected and operates the recording/playback change-over switches 50C to 50G, such that these switches select the R terminals. Sounds are collected by and converted into electric audio signals by the microphone 30, and the thus obtained audio signals are transmitted through an audio recording amplifier 84, the recording/playback change-over switch 50G, the filter 76, the noise reduction circuit 78, the recording/playback change-over switch 50F and the A/D converter 68. The digital audio signals derived from the A/D converter 68 are written in the audio memory 70. The writing operation ceases when acoustic data of an amount corresponding to the capacity of one track on the magnetic disk 45 has been written in the audio memory 70. The audio data stored in the audio memory 70 is read in a time-base-compressed manner and converted into analog signals through the D/A converter 72. The analog audio signals are then supplied to a synthesizing circuit 85, through the recording/playback change-over switch 50E, a low-pass filter 64 and the recording/playback change-over switch 50D. The synthesizing circuit 85 adds various data to the beginning and tail ends of the compressed audio signals including normalized start flag, control code and end flag which are delivered by the system controller 62, whereby a time-division synthetic signal is obtained. The thus formed time-division synthetic signal is transmitted and processed successively through a pre-emphasis circuit 86, the recording/playback change-over switch 50C, the recording/playback change-over switch 50B, the video/audio change-over switch 46B, the FM demodulation circuit 88, the recording amplifier 90 and the recording/playback change-over switch 50A. The processed signal is supplied to the magnetic head 44 so that FM-modulated audio signals are recorded in a predetermined track on the magnetic disk 45.

When the operation switch is manipulated to enable the camera device to record an image, the system controller 36 operates the recording/playback change-over switches 50A and 50B to cause them to select the R terminals, while operating the video/audio change-over switch 46A, 46B to select the V terminals. Thus, the object image is focused on the imaging surface of an imaging device 94 through a photographing lens 92. Then, signals are read from successive pixels of the imaging device 94 and are supplied to a video processing circuit 96, whereby a composite video signal is formed. The composite video signal is then transmitted and processed through the video/audio change-over switch 46B, the FM modulation circuit 88, a recording amplifier 90 and the recording/playback change-over switch 50A. The processed signal is then supplied to the magnetic head 44 so that FM-modulated composite image signal is recorded in a predetermined track of the magnetic disk 45.

When the operation switch 16 is manipulated to enable the camera to operate for video playback operation, the system controller 36 operates the recording/playback change-over switches 50A, 50B to cause them to select the P terminals, while operating the video/audio change-over switches 46A, 46B to cause them to select the V terminals. Thus, the video signals from the magnetic head 44 are delivered to the video processing circuit 96 through the recording/playback change-over switch 50A, playback amplifier 58 and the FM demodulation circuit 60, so that FM-demodulated composite video signal is obtained at a video output terminal 98.

Figures 3A, 3B:
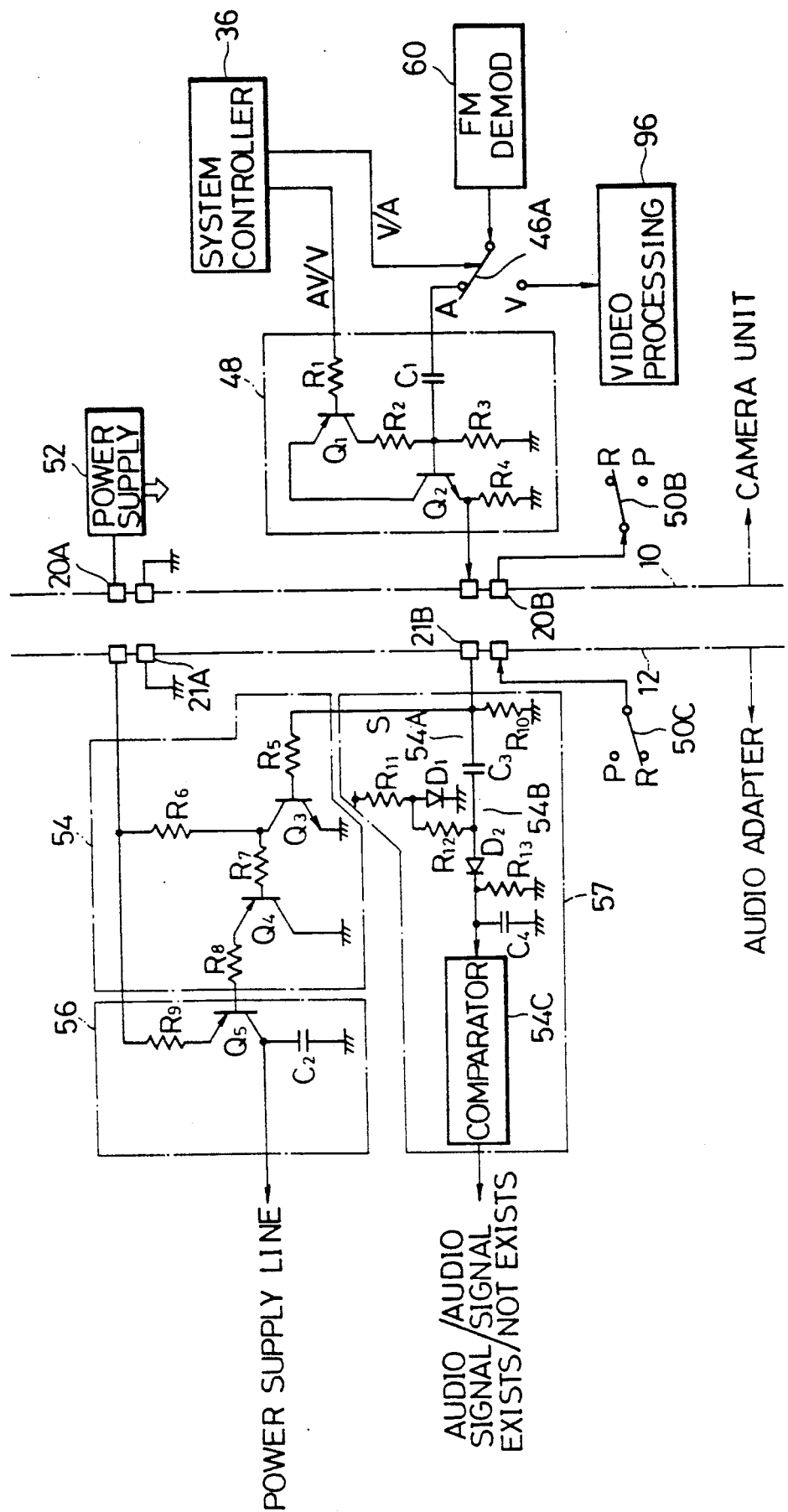
FIG. 3A is a circuit diagram of an essential portion of the camera unit shown in FIG. 2A.
FIG. 3B is a circuit diagram of an essential portion of the audio adapter shown in FIG. 2B.

A description will be given hereafter of practical examples of arrangements of the AV/V switch 48, the switch control circuit 54, the AV/V switch 56 and the audio/non-audio discriminator 57, with specific reference to FIGS. 3A and 3B.

An AV/V switch 48 on the camera unit 10 includes resistors $R_1$ to $R_4$, a coupling capacitor $C_1$, a PNP transistor $Q_1$ and the NPN transistor $Q_2$. When the AV mode is selected, the system controller 36 delivers a voltage signal of high (referred to as "H" hereinafter) level to the base of the PNP transistor $Q_1$ through the resistor $R_1$ so that the PNP transistor $Q_1$ becomes conductive. As a result, the NPN transistor $Q_2$ is turned ON so that the a signal of H level is obtained at the emitter of the NPN transistor $Q_2$ as the output of the AV/V switch 48. The switch control circuit 54 of the audio adapter 12 comprises resistors $R_5$ to $R_8$, NPN transistor $Q_3$ and PNP transistor $Q_4$. When the output of the AV/V switch 48 is set high (H) after the connection of the audio adapter 12 to the camera unit 10, the output of H level is supplied through the resistor $R_5$ to the base of the NPN transistor $Q_3$, whereby the NPN transistor $Q_3$ and, accordingly, the PNP transistor $Q_4$ are turned ON.

The AV/V switch 56 comprises resistor $R_9$, PNP transistor $Q_5$ and a noise removing capacitor $C_2$. When the PNP transistor $Q_4$ of the switch control circuit 54 is turned ON, PNP transistor $Q_5$ is turned ON, whereby the voltage from the power supply 52 is delivered to the power line of the audio adapter 12.

The audio/non-audio discriminator 57 includes a DC component removing differentiation circuit 54A composed of resistor $R_{10}$ and a capacitor $C_3$, rectifier/smoothing circuit 54B composed of resistors $R_{11}$ to $R_{13}$, and smoothing capacitor $C_4$ and detector diodes $D_1$, $D_2$. When the compressed audio signals from the FM demodulation circuit 60 is delivered to the audio/non-audio discriminator 57 through the AV/V switch 48, the comparator 54C provides a signal of H level. Conversely, when the compressed audio signal is not supplied, the comparator 54C delivers an output of low (L) level.

Figure 5A:
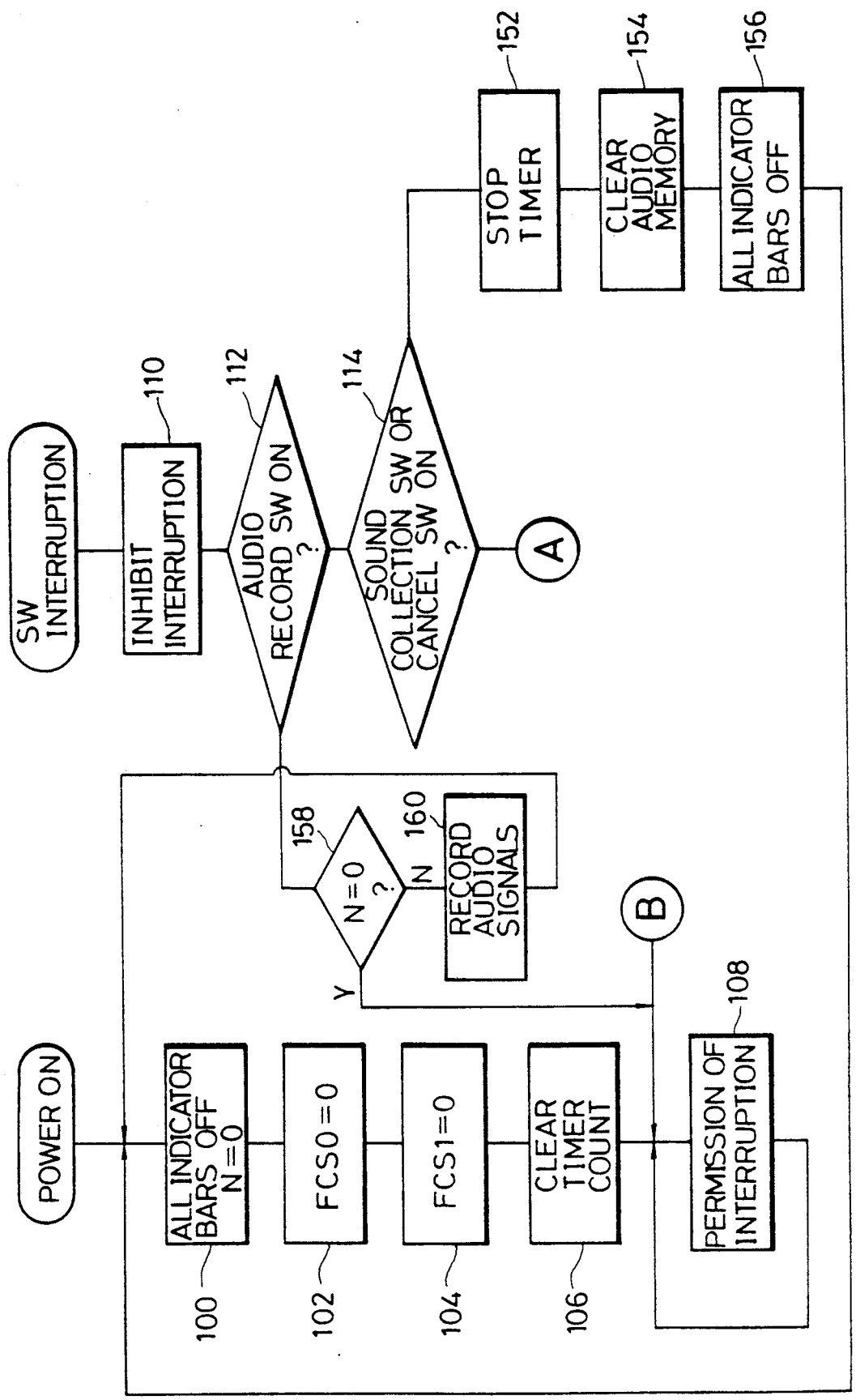
FIGS. 5A and 5B are flow charts explaining of the operation of a system controller in the audio adapter shown in FIG. 2B, illustrating particularly a process performed by the system controller in connection with the indication of amount of collected sound.
Figure 5B:
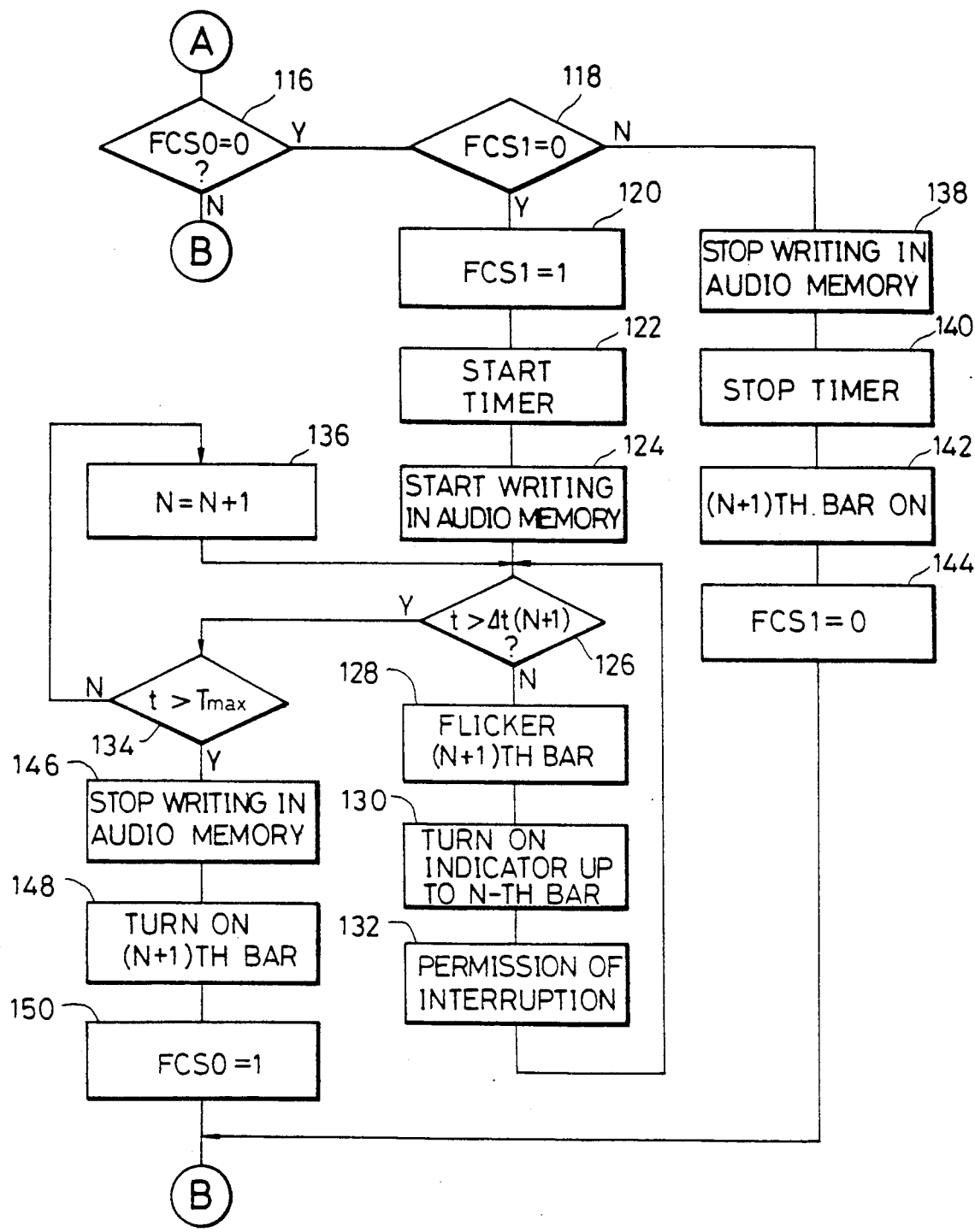

FIGS. 5A and 5B show flow charts of a collected sound amount indicator program which is written in the ROM of a system controller 62. This program will be explained with reference to FIGS. 5A and 5B, as well as to a timing chart shown in FIGS. 6A to 6J. As the AV/V switch 48 is turned ON, the voltage of the system power supply 52 is supplied to the system controller 62 through the AV/V switch 56, so that the execution of the program is started.

An initializing process is conducted in Steps 100 to 106. Namely, in Step 100, all the indicator bars of the collected sound amount indicator 34 are turned OFF so that the indicator indicates that the amount of collected sound is zero. In Step 102, flag FCS0, which indicates the filling up of the audio memory, is set to zero. In Step 104, flag FSC1, indicative of whether the present instruction is the sound collection starting instruction or the sound collection stopping instruction, is set to zero. In Step 106, the count value in the timer indicative of the amount of the collected sound is cleared.

In Step 108, the system waits for any interruption which is generated when one of the sound collection switch 32A, recording switch 32b or the cancel switch 32C is turned ON.

Referring specifically to FIG. 6, when the sound collecting switch 32A is operated, the camera device starts to collect sounds and the amount of sounds collected is shown on the collected sound amount indiator 34.

In response to an interruption triggered by the operation of the sound collecting switch 32A, re-interruption is inhibited in Step 110 and the process proceeds to Step 120 after judging operations which are conducted in Steps 112 to 118. In Step 120, flag FCS1 is set so that the next instruction from the sound collecting switch 32A will be judged as sound collection stopping instruction.

The timer is started in Step 122 and writing of data in the audio memory 70 is commenced in Step 124.

The process then proceeds to Step 126, in which it is determined whether a condition of $t > \Delta t(N+1)$, where t represents the content of the timer t, is met. The symbol $\Delta t$ represents a unit sound collection time which equals to 1/10 of the maximum sound collecting time corresponding to the maximum sound collection amount. Practically, the unit sound collection time $\Delta t$ equals a value which is obtained by dividing the maximum sound collection amount by the number of the indicatorbar bars incorporated in the sound collection amount indiator 34. The number N has been set to zero in Step 100 as explained before.

Figure 4:
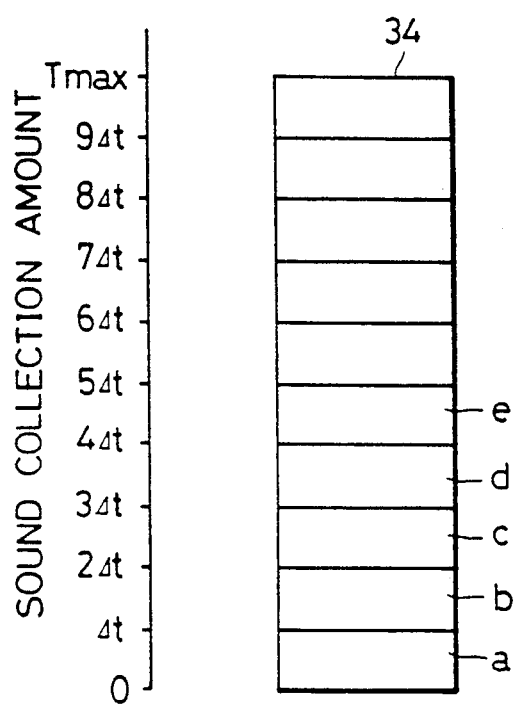
FIG. 4 is an illustration of the relationship between the state of a sound amount indicator incorporated in the camera device shown in FIG. 1 and the amount of sound collected.

If the answer is NO, the process proceeds to Step 128 in which indcator bar a, which is the (N+1)th bar as counted from the bottom of the indicator 34 shown in FIG. 4, is made to blink. In Step 130, the indicator bars which are below the (N+1)th bar a are turned ON. Other indicator bars, which were turned OFF in Step 100, are maintained in the OFF state. The blinkering of the indicator bar a informs the user that the sound collecting operation is being executed.

In Step 132, an interruption mask is reset so as to allow re-interruption which may be triggered by operation of the sound collection switch 32A, sound recording switch 32B or the cancel switch 32C.

The process then returns to Step 126 and the operation explained above is executed again.

Namely, when the answer to the question posed in Step 126 is YES, the process proceeds to Step 134 in which it is determined whether the condition of t>Tmax is met, where Tmax represents the maximum sound collection amont (see FIG. 4).

If the answer in Step 134 is NO, the value of the number N is incremented in Step 136 and the process returns to Step 126. Then, Steps 128 and 130 are executed as explained before. In consequence, the indicator bar a is turned ON and the next indicator bar b is made to blink (see FIG. 6C).

Thus, the indicator bars of a number corresponding to the amount of the collected sound are turned ON and the indicator bar which is to be turned ON next blinks. When the sound collecting switch 32A is operated during the sound collecting operation, an interruption is generated so that Steps 110 to 118 are executed to proceed the process to Step 138, whereby the writing of sound data in the audio memory 70 is stopped.

Then, the timer is stopped in Step 140 and the (N+1)th bar which is blinking, i.e., indicator bar c shown in FIGS. 4 and 6E, is turned ON. Thus, the indicator bar c does not blink any more. The termination of the blinking informs the user of the fact that the sound collecting operation is temporarily suspended. Then, in Step 144, flag FSC1 is reset so that the next instruction from the sound collection switch 32A may be judged as being a sound collection starting instruction. Then, the interruption mask is reset in Step 108 so that the system is ready to receive the next interruption. An operation of the sound collection switch 32A in this state generates an interruption so that Steps 110 to 128 are executed as explained before, and the indicator bar c which has been turned ON starts to blink again. (see FIG. 6E)

If the sound collecting operation is completed before the maximum sound collection amount is reached, the user operates the sound recording switch 36B so that an interruption is generated. In this case, the process proceeds to Step 158 after execution of Steps 110 and 112. If the number N is not zero, all the audio data stored in the audio memory 70 are time-base-compressed and recorded on a predetermined track on the magnetic disk 45, while the address counter 62a is initialized.

Subsequently, the process proceeds to Step 100 and the initializing routine of Steps 100 to 106 is executed as explained before, whereby the system is reset in the state which allows a re-interruption.

If the cancel switch 32C is operated during or after the sound collecting operation, the process proceeds to Step 152 after execution of Steps 110 to 114, so that the timer is stopped. Then, the content of the audio memory 70 is cleared and the address counter 62a is initialized in Step 154. In Step 156, all the indicator bars of the sound collection amount indicator 34 are turned OFF and the process returns to Step 100.

Although the invention has been described through its preferred forms, it is to be understood that the described embodiments are only illustrative and various changes and modifications may be imparted thereto.

For instance, the sound collection amount indicator, which is of the type having a plurality of indicator bars in the described embodiment, may be substituted by other suitable types of indicators such as an indicator that is capable of indicating the amount of the collected sound by means of numerals.

It is also possible to use separate switches for giving the sound collection starting instruction and the sound collection stopping instruction separately, although the described embodient employs a single sound collection switch 32A which is capable of alternately giving both types of instruction.

Other changes and modifications are still possible without departing from the scope of the present invention which is limited solely by the appended claims.

What is claimed is:

1. An electronic still camera device having an audio recording device in which sound collected through a microphone is written to a temporary audio storage means in said audio recording device, said written audio data being read at a later time and transferred to a recording medium in said electronic still camera, said electronic still camera device comprising:
   sound collection starting switch means for producing a sound collection starting instruction;
   sound collection stopping switch means for producing a sound collection stopping instruction;
   cancel switch means for producing a cancelling instruction;
   audio recording switch means for producing an audio recording instruction;
   address memory means for storing an address corresponding to said audio data that is stored in said temporary audio storage means;
   writing control means that is operative in response to said sound collection starting instruction, for enabling said audio data to be written to said temporary audio storage means at a determined address by said address memory means while updating said address memory means;
   writing stop control means for stopping said writing of audio data to said temporary audio storage means in response to said sound collection stopping instruction;
   cancel control means that is operative in response to said cancelling instruction for erasing said audio data stored in said temporary audio storage means while initializing said address memory means; and
   audio recording control means that is operative in response to said audio recording instruction for reading said audio data stored in said temporary audio storage means and transfering said read audio data to said recording medium.

2. An electronic still camera device according to claim 1, further comprising:
collected sound amount indicator means for indicating an amount of sound collected by said temporary audio storage means; and
indicator control means for controlling said collected sound amount indicator means in such a manner that said collected sound amount indicator means indicates the amount of collected sound corresponding to said address memory means.

3. An electronic still camera device according to claim 2, wherein said indicator control means is capable of enabling said collected sound amount indicator means to also indicate device is operating in a sound collecting mode.

4. An electronic still camera device according to claim 3, wherein said collected sound amount indicator means includes a plurality of indicator elements, said indicator control means being capable of turning ON a predetermined number of indicator elements corresponding to said amount of sound collected in said temporary audio storage means in such a manner that said indicator elements are successively turned ON from one end towards another end of said indicator means, causing an indicator element which is to be next turned ON to blink, thereby informing a user that said audio recording device is operating in said sound collecting mode.

5. An electronic still camera device according to claim 2, wherein said sound collection starting switch means and said sound collection stopping means comprises:
a sound collection switch; and
means for judging an output from said sound collection switch in response to an odd-number-th operation of said sound collection switch that corresponds to said sound collection starting instruction, while said output from said sound collection switch in response to an even-number-th operation of said sound collection switch corresponds to said sound collection stopping instruction.

6. An electronic still camera having a compression audio recording device in which sound collected through a microphone is written to a temporary audio storage means associated with said audio recording device through an A/D converter, said written audio data being read in a time-base-compressed manner and transferred to a recording medium associated with said electronic still camera through a D/A converter, said electronic still camera device comprising:
sound collection starting switch means for producing a sound collection starting instruction;
sound collection stopping switch means for producing a sound collection stopping instruction;
cancel switch means for producing a cancelling instruction;
audio recording switch means for producing an audio recording instruction;
address memory means for storing an address corresponding to said audio data stored in said temporary audio storage means;
writing control means operative in response to said sound collection starting instruction for enabling said audio data to be written to said temporary audio storage means at a predetermined address through said A/D converter while updating said address memory means;
writing stop control means for stopping said writing of audio data to said temporary audio storage means in response to said sound collection stopping instruction;
cancel control means that is operative in response to said cancelling instruction for erasing said audio data stored in said temporary audio storage means while initializing said address memory means; and
audio recording control means that is operative in response to said audio recording instruction for reading said audio data stored in said temporary audio storage means in a time-base-compressed manner and transferring said read data to said recording medium.

7. An electronic still camera unit to which an audio adapter may be selectively attached, comprising:
an audio signal input terminal through which audio signals temporarily stored in said audio adapter are supplied from said audio adapter to a recording medium in said electronic still camera unit;
an audio signal output terminal through which audio signals are supplied from said electronic still camera unit to said audio adapter;
means for writing said audio signals from said temporary storage through said audio signal input terminal to said recording medium; and
means for reading said audio signals from said recording medium and delivering said read audio signals through said audio output terminal.

8. An audio adapter capable of being detachably mounted on a electronic still camera unit, comprising:
a microphone;
first means for processing audio signals from said microphone;
means for temporarily storing said processed audio signals;
an audio signal output terminal through which said audio signals processed by said first audio signal processing means are supplied to a recording medium of said electronic still camera unit;
an audio signal input terminal through which audio signals are supplied from said electronic still camera unit to said audio adapter; and
second means for processing audio signals supplied through said audio input terminal.

9. An electronic still camera device having an audio adapter that is capable of being detachably mounted to an electronic still camera unit, wherein said electronic still camera unit comprises:
an audio signal input terminal through which audio signals temporarily stored in said audio adapter are supplied from said adapter to a recording medium in said electronic still camera unit;
an audio signal output terminal through which audio signals are supplied from said electronic still camera unit to said audio adapter;
means for writing said audio signals supplied through said audio input terminal to said recording medium; and
means for reading said audio signals from said recording medium and delivering said read audio signals through said audio output terminal;
and wherein said audio adapter comprises:
a microphone;
first means for processing audio signals from said microphone;

means for temporarily storing said processed audio signals;

an audio signal output terminal through which said temporarily stored audio signals processed by said first audio signal processing means are supplied to said electronic still camera unit;

an audio signal input terminal through which audio signals are supplied from said electronic still camera unit to said audio adapter; and second means for processing audio signals supplied through said audio input terminal.

10. An electronic still camera device, comprising:

a camera unit having an imaging device for imaging an object, a first external input terminal through which compressed audio signals are inputted to said camera unit, a recording medium that is capable of recording image signals from said imaging device and said compressed audio signals from said first external input terminal, and a first output terminal through which said image signals and said compressed audio signals reproduced from said recording medium are externally delivered; and an audio adapter that is capable of being selectively attached to said camera unit and which is operable in both an audio recording mode and in an audio playback mode, said audio adapter including a microphone that is capable of collecting sounds in said audio recording mode, an A/D converter for converting an output from said microphone into digital audio signals, means for temporarily storing said digital audio signals, means for reading said audio data from said temporary audio storage means in a time-base-compressed manner, a second external output connectable to said first external input terminal of said camera unit so as to deliver said time-base-compressed audio signals to said camera unit, a second external input terminal connectable to said first external output terminal of said camera unit so as to receive time-base-compressed audio signals from said camera unit, and means for effecting a time-base-expansion of said received time-base-compressed audio signals.

11. An electronic still camera device according to claim 10, wherein said audio adapter further includes:

means for determining the presence of said time-base-compressed audio signal from said second external input terminal; and mode control means for setting said audio adapter to said audio playback mode when said determining means determines that said time-base-compressed audio signal exists, and in said audio recording mode when said determining means determines that said time-base-compressed audio signal does not exist.

12. An electronic still camera device according to claim 11, wherein said determining means includes:

means for rectifying and smoothing said compressed audio signal so as to convert said compressed audio signal into a D.C. voltage; and means for comparing said D.C. voltage with a reference value;

whereby said determining means determines that said compressed audio signal exists when said D.C. voltage is greater that said reference value.

13. An electronic still camera device according to claim 11, wherein said camera unit further includes a power supply having an output terminal connected to an external power supply terminal and which is capable of supplying a source voltage to said camera unit, and D.C. voltage superposing means connected to said first external output terminal for superposing a D.C. voltage to a HIGH signal level or a LOW signal level, depending on whether said audio recording mode or said audio playback mode has been selected, and wherein said audio adapter further includes a power supply switch having one end connected to a third input terminal connected to said external power supply terminal, a remaining end of said power supply switch being connected to a power line of said audio adapter, and power supply switch control means for turning said power supply switch ON and OFF in accordance with said signal the level of said D.C. voltage received at said second external input terminal.

14. An electronic still camera device according to claim 10, wherein said camera unit further includes a power supply having an output terminal connected to an external power supply terminal for supplying a source voltage to said camera unit, and D.C. voltage superposing means connected to said first external output terminal for superimposing a D.C. voltage of a HIGH signal level or a LOW signal level depending on whether said audio recording mode or said audio playback mode has been selected, and wherein said audio adapter further includes a power supply switch having one end connected to a third input terminal connected to said external power supply terminal and a remaining end that is connected to a power line of said audio adapter, power supply switch control means for turning said power supply switch ON and OFF in accordance with said signal level of said D.C. voltage received at said second external input terminal, means for determining whether a compressed audio signal from said second input terminal exists, and mode control means for setting said audio adapter to said audio playback mode when said determining means determines that said compressed audio signal exists, and to said audio recording mode when said determining means determines that said compressed audio signal does not exist.

15. An electronic still camera device according to claim 14, wherein said determining means includes:

means for rectifying and smoothing said compressed audio signal so as to convert said compressed audio signal into a D.C. voltage; and means for comparing said D.C. voltage with a reference value;

whereby said determining means determines that said compressed audio signal exists when said D.C. voltage is greater than said reference value.

16. An electronic still camera device according to claim 10, wherein said audio adapter further includes:

sound collection starting switch means for producing a sound collection starting instruction;

sound collection stopping switch means for producing a sound collection stopping instruction;

cancel switch means for producing a cancelling instruction;

audio recording switch means for producing an audio recording instruction;

collected sound amount indicator means for indicating an amount of collected sound;

address memory means for storing an address corresponding to said audio data in said temporary audio storage means;

writing control means, operative in response to said sound collection starting instruction, for enabling said audio data to be written to said temporary audio storage means at a determined address through said A/D converter while updating said address memory means;

indicator control means for enabling said collected sound amount indicator means to indicate an amount of collected sound corresponding to said address memory means;

means for stopping said writing of audio data to said temporary storing means in response to said sound collection stopping instruction;

cancel control means operative in response to said cancelling instruction so as to erase said audio data stored in said temporary audio storage means while initializing said address memory means; and audio recording control means operative in response to said audio recording instruction so as to read said audio data stored in said temporary audio storage means in a time-base-compressed manner and writing said read data to said recording medium.

17. An electronic still camera device according to claim 16, wherein said indicator control means is capable of enabling said collected sound amount indicator means to also indicate a sound collecting mode.

18. An electronic still camera device according to claim 17, wherein said collected sound amount indicator means includes a plurality of indicator elements, said indicator control means being capable of turning ON a predetermined number of indicator elements that correspond to the amount of sound collected, in such a manner that said indicator elements are successively turned ON from one end towards another end of said indicator means, causing an indicator element which is to be turned ON next to blink, thereby informing a user that said electronic still camera device is operating in said sound collecting mode.

19. An electronic still camera device according to claim 12, wherein said sound collection starting switch means and said sound collection stopping means includes:

a sound collection switch; and means for determining an output from said sound collection switch in response to an odd-number-th operation of said sound collection switch that corresponds to said sound collection starting instruction, while said output from said sound collection switch in response to an even-number-th operation of said sound collection switch corresponds to said sound collection stopping instruction.

20. An electronic still camera device having an audio recording device that is selectively connectable to said electronic still camera, in which audio data collected through a microphone associated with said audio recording device is temporarily stored in a memory associated with said audio recording device, said temporarily stored data being transferred at a later time from said memory in said audio recording device to a recording medium associated with said electronic still camera, said electronic still camera device comprising:

means for issuing a sound collection starting instruction;

means for issuing a sound collection stopping instruction;

means for issuing a cancelling instruction;

means for issuing an audio recording instruction;

means for enabling said audio data to be temporarily stored in said memory in response to said sound collection starting instruction means;

means for stopping said temporary storage of audio data in said memory in response to said sound collection stopping instruction means; and means for controlling said audio recording in response to said audio recording instruction means so as to transfer said audio data temporarily stored in said memory of said audio recording device to said recording medium of said electronic still camera.

21. The electronic still camera of claim 20, further comprising:

means for indicating a quantity of audio data stored in said temporary memory.

22. The electronic still camera device of claim 21, wherein said indicator means also indicates a sound collecting mode.

23. The electronic still camera device of claim 22, wherein said indicator means comprises a bar code indicator means having a plurality of bar elements, a predetermined number of bar elements being illuminated that corresponds to said quantity of audio data stored in said temporary memory.

24. The electronic still camera of claim 23, wherein a bar element that is next in line to be illuminated is caused to blink so as to indicate said sound collecting mode.

25. A camera system, comprising:

an electronic still camera, comprising:
  means for storing video signals and audio signals; and
  means for controlling said storing means; and an audio recording device that is selectively connectable to said electronic still camera, comprising:
  a microphone for receiving audio data;
  a memory for temporarily storing said received audio data, said temporarily stored audio data being transferred at a later time from said memory in said audio recording device to said storing means of said electronic still camera, wherein said controlling means of said electronic still camera controls a transfer of said audio data temporarily stored in said memory to said storing means of said electronic still camera.

* * * * *

UNITED STATES PATENT AND TRADEMARK OFFICE
CERTIFICATE OF CORRECTION

PATENT NO. : 5,014,136
DATED : May 7, 1991
INVENTOR(S) : N. SAKAI et al.

It is certified that error appears in the above-indentified patent and that said Letters Patent is hereby corrected as shown below:

In section (57), Abstract, line 1, after "unit" insert ---that is---.

In section (57), Abstract, line 3, after "adapter" insert ---which can be---.

In section (57) Abstract, line 6, before "capable" insert ---that is---.

In section (57) Abstract, line 6, "To" should be ---In order to---.

In section (57) Abstract, line 7, after "lines" insert ---which are to be provided---.

At Column 17, line 4, after "data" insert ---stored---.

UNITED STATES PATENT AND TRADEMARK OFFICE
CERTIFICATE OF CORRECTION

PATENT NO. : 5,014,136
DATED : May 7, 1991
INVENTOR(S) : N. Sakai et al.

It is certified that error appears in the above-indentified patent and that said Letters Patent is hereby corrected as shown below:

At column 17, line 4, after "data" insert --stored--.

Signed and Sealed this

Second Day of April, 1996

Attest:

BRUCE LEHMAN

*Attesting Officer*     *Commissioner of Patents and Trademarks*